United States Patent Office 3,423,106
Patented Jan. 21, 1969

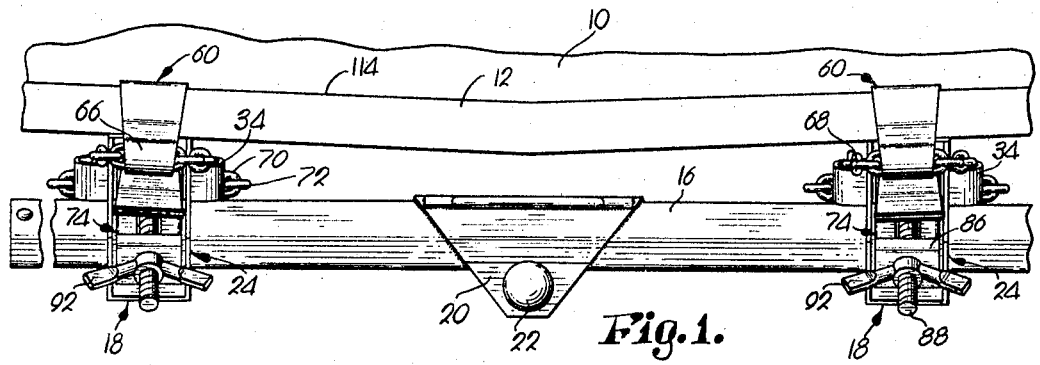
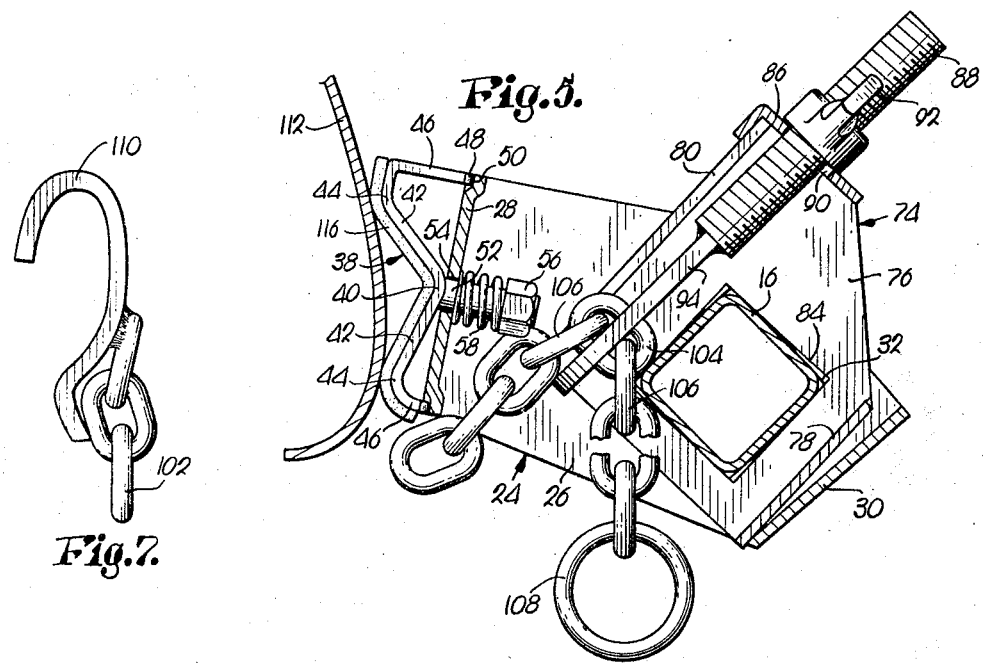
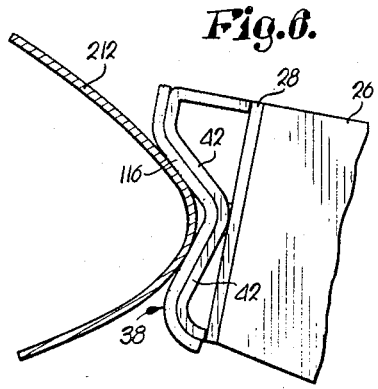
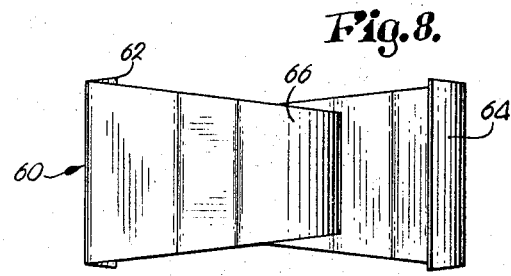
INVENTOR
William R. Parkhurst

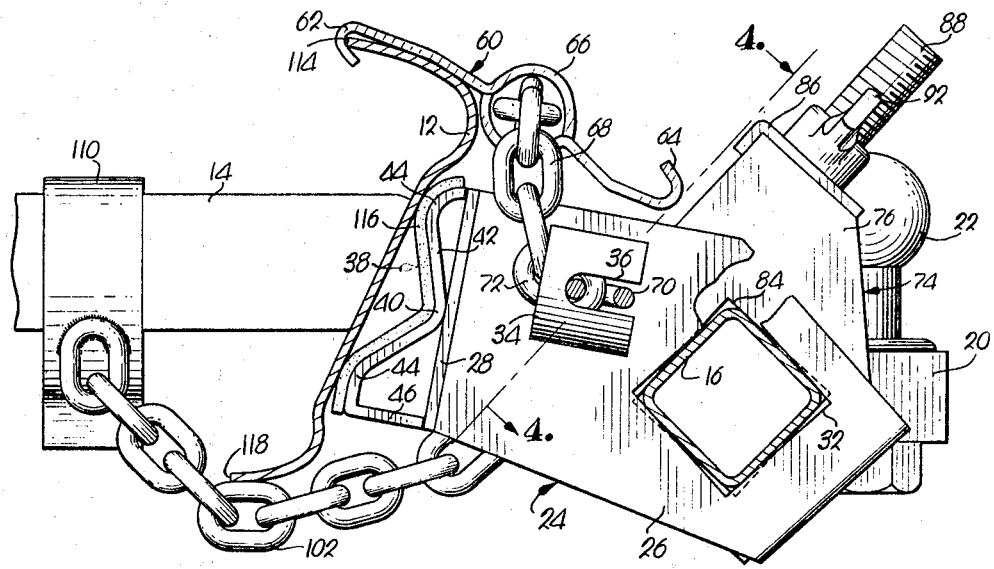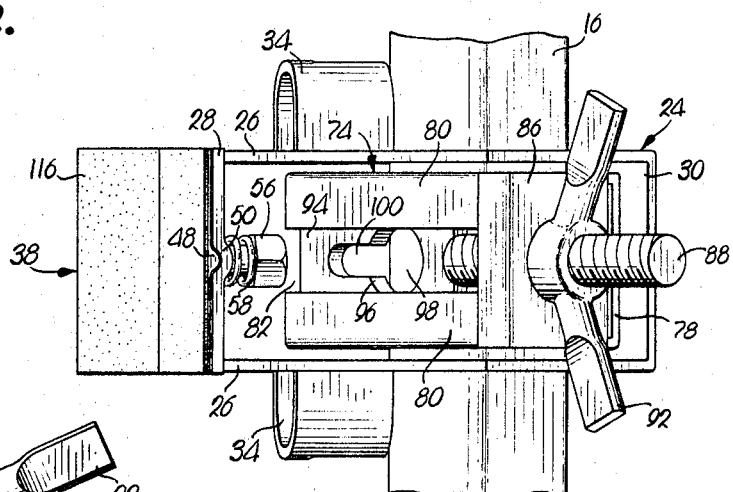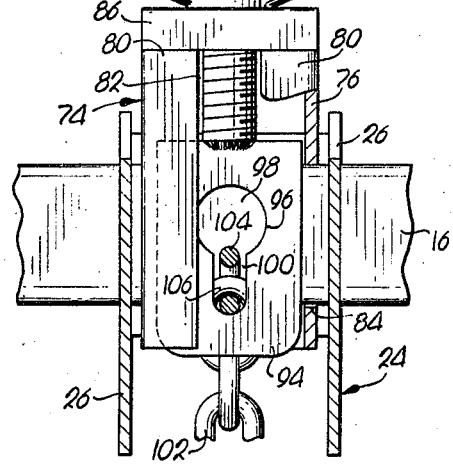

3,423,106
TRAILER HITCH
William R. Parkhurst, Sedalia, Mo., assignor to Parkhurst Manufacturing Company, Sedalia, Mo., a corporation of Missouri
Filed Mar. 9, 1967, Ser. No. 621,965
U.S. Cl. 280—502                    4 Claims
Int. Cl. B60d 1/00

ABSTRACT OF THE DISCLOSURE

A hitch having a pair of units slidably carried on a drawbar, each unit including a box mount engaging the bumper of a towing vehicle and attached thereto by a chain having a hook latch secured over the upper edge of the bumper. A second chain extends below the bumper for hooking to the vehicle and is coupled to the drawbar by take-up means disposed within the mount for frictionally clamping the bar against the mount. An inclined bumper engaging member is provided on the mount and is rotatable to vary its angle as dictated by the particular configuration of the bumper, thereby maintaining the hitch in a level position.

---

This invention relates to a hitch and, more particularly, to an adjustable trailer hitch especially adapted for use in the trailer rental industry.

It is the primary object of the present invention to provide a hitch having adjustable components which permit universal fitting of the hitch on virtually all types of bumpers and additionally, are easily and quickly positioned on the bumper and thereafter locked securely thereto by simple hand-operated means.

It is another object of the instant invention to provide a hitch as above described wherein an adaptor member is included for engaging and adjustably shifting against the bumper whereby the vertical inclination of the hitch with respect to the bumper may be varied to level the hitch, notwithstanding the particular configuration of the bumper.

Other objects include details of construction which will become apparent from the following specification and accompanying drawings, wherein:

FIGURE 1 is a fragmentary, top plan view of a hitch made pursuant to the teachings of my invention and showing the same mounted on one type of bumper;

FIG. 2 is a fragmentary, enlarged, vertical cross-sectional view through the bumper and drawbar and showing one of the hitching units in side elevation;

FIG. 3 is a plan view of a unit, parts being removed to reveal details of construction;

FIG. 4 is a cross-sectional view taken along line 4—4 of FIG. 2, parts being broken away for clarity;

FIG. 5 is a fragmentary, substantially central, vertical cross-sectional view of a unit showing the same mounted on a second type of bumper;

FIG. 6 is a fragmentary view similar to FIG. 5, showing the mount on a third type of bumper;

FIG. 7 is a fragmentary, front elevational view of the hook and chain which forms a part of the take-up means; and FIG. 8 is a plan view of the latch which hooks over the upper edge of the bumper.

The present invention is adapted for use with a towing vehicle 10 having attachable structure such as a rear bumper 12, and a rearwardly extending frame bracket 14 securing bumper 12 to the main frame of vehicle 10. The hitch includes a drawbar 16 which is carried rearwardly of and parallel to bumper 12 by a pair of horizontally spaced hitch units 18. Drawbar 16 includes a coupling such as a horizontal shelf 20 and a ball 22 thereon for connecting with the vehicle to be towed in the conventional manner.

Hitch unit 18 includes a box-like mount 24 having a pair of horizontally spaced side portions or plates 26, a front plate 28 and a rear plate 30. Mount 24 is open at its upper and lower ends and each side plate 26 includes a square opening 32 for receiving drawbar 16. As shown in FIG. 2, the drawbar chosen for illustration is hollow and has a square, cross-sectional configuration, the openings 32 being sufficiently large to present a slightly loose fit between drawbar 16 and mount 24, thereby permitting longitudinal reciprocation of mount 24 along drawbar 16.

A U-shaped collar 34 is provided on the outer face of each side plate 26 and includes a longitudinal slot 36 communicating with the rear edge of collar 34. A substantially V-shaped member 38 is secured by rotatable apparatus to front plate 28 for engaging bumper 12 and present an apex 40, opposed legs 42, and respective outer ends 44. Each end 44 is provided with a rearwardly projecting extension 46, each extension having a tongue 48 adapted to be received in corresponding recesses 50 formed in front plate 28. A stud 52 is secured to the rear surface of apex 40 and extends through an aperture 54 in front plate 28. A nut 56 is threadably received on stud 52 and a compressed coil spring 58 is journalled about stud 52 and interposed between front plate 28 and nut 56 to normally bias member 38 against front plate 28.

Referring to FIG. 8, a latch 60 is provided and includes a pair of trapezoidal plates each terminating at one end thereof in respective hook-like catches 62 and 64 and each having a semicircular bend at the other end thereof for connection to form a sleeve 66. An upper chain 68 extends through sleeve 66 and is connected at its opposed ends through collars 34 by interlocking with respective slots 36. Thus, as shown in FIG. 2, link 70 of chain 68 is positioned to extend through slot 36, while the links 72 on each side of link 70 are positioned to preclude movement of the chain through collar 34.

A box-like element 74 is disposed between side plates 26 and includes side panels 76, rear panel 78, and a front panel 80 having a longitudinal opening 82 formed therein. Each side panel 76 is provided with a square opening 84 for receiving drawbar 16 therethrough, openings 84 being in alignment with openings 32 whereby element 74 is reciprocable along drawbar 16 as mount 24 is shifted thereon. Element 74 is open at its lower end and is provided with a top panel 86 at its upper end.

Take-up means for the hitch includes a screw 88 extending through an aperture 90 in top panel 86, there being a wing nut 92 journalled over one end of the screw and bearing against the outer surface of top panel 86. A key plate 94 is secured to the lowermost end of screw 88 and is disposed in substantially parallel relationship with front panel 80. A keyway 96 is formed in key plate 94 and includes an enlarged opening 98 communicating with a relatively narrow opening 100. Keyway 96 is aligned with longitudinal opening 82 formed in panel 80 as best shown in FIGS. 3 and 4.

A lower chain 102 extends through keyway 96 and may be interlocked with the latter by inserting a link 104 in opening 100 whereby opposed links 106 preclude shifting of the chain through keyway 96 (FIG. 5). The normally rear end of lower chain 102 is provided with a finger ring 108 and the other end is provided with a hook 110 welded or otherwise suitably attached to chain 102 as shown in FIG. 7.

In operation, the hitch is adapted to be attached to virtually any configuration of bumper and, in the drawings, has been shown attached to bumper 12 in FIGS.

1 and 2 to a bumper 112 in FIG. 5, and to bumper 212 in FIG. 6. Initially, hitch units 18 are reciprocated along drawbar 16 until they are disposed in the desired horizontally spaced positions with respect to bumper 12. The desired position would, of course, include clearing of any bumper guards which may be mounted on bumper 12, and also, units 18 are preferably aligned with respective frame brackets 14.

The hitch is placed on the bumper by hooking latches 60 over the upper edge 114 of bumper 12 as shown in FIG. 2. Latch 60 is selectively rotated about chain 68 to place either of the catches 62 or 64 in hooking position. The hook opening for catch 64 is larger than that for catch 62 and thus, the catch utilized will be dictated by the particular thickness of edge 114 of bumper 12.

Referring to the bumper configuration in FIG. 2, the outer ends 44 of member 38 engage the outer surface of bumper 12 to position the respective mount 24. A cushion 116 is secured to the face of member 38 so that the metallic surface of the bumper will not become scratched during use of the hitch. The selected position of member 38 is dictated by the particular configuration of the bumper and is arranged so that ball 22 and shelf 20 are disposed in a level manner for optimum coupling to the towed vehicle.

The particular vertical inclination of mount 24 may be varied by drawing tongues 48 from recesses 50 against the action of spring 58 and then rotating member 38 180° about the axis of stud 52 to the position shown in FIG. 5. It will be recognized that one of the extensions 46 is longer than the other, whereby the area of contact of cushion 116 with the bumper defines a vertical inclined plane with respect to the axis of rotation of stud 52, to the end that the position of member 38 as shown in FIG. 2, adapts the mount for bumper 12 extending forwardly and downwardly, while the position of member 38 shown in FIG. 5 adapts the mount for use on a forwardly and upwardly extending bumper 112. Member 38 may also be adapted for use with "bullet" type bumpers as shown in FIG. 6 wherein the legs 42 of member 38 engage the upper and lower surfaces of bumper 212 adjacent the apex of the latter.

The vertical inclination of mount 24 may also be varied on the types of bumpers shown in FIGS. 5 and 6 by lengthening or shortening the effective length of upper chain 68 which is effected by drawing the opposed ends of chain 68 through respective collars 34 and interlocking the proximal link with slot 36. It will be recognized that this operation will change the relative vertical contacting position of member 38 on the bumper, and since the latter changes in angularity along its vertical dimension, the vertical inclination of mount 24 will correspondingly vary. Chain 68, therefore, serves as an extendible length of material between the points of attachment of latch 60 on bumper 12 and the interlocking of the chain with collars 34, and the latter thereby serves as a means for varying the effective distance between these points. Thus, the cooperation between member 38 and the connecting mechanism defined by latch 60, chain 68 and collars 34 provides a means for leveling the hitch on a bumper of virtually any vertical cross-sectional configuration.

Hook 110 of each mount 24 is positioned over the corresponding bracket 14 as shown in FIG. 2, and chain 102 extends below the lower edge 118 of bumper 12 through keyway 96 and extends downwardly to terminate in finger ring 108. As seen in FIG. 5, the proximal link 104 is interlocked in the restricted opening 100 of keyway 96, whereupon wing nut 92 is tightened to draw link 104 upwardly and thereby draw element 74 toward the bumper. As element 74 is shifted, drawbar 16 is drawn into engagement with the proximal side edges of openings 32 of mount 24. Wing nut 92 is hand-tightened until drawbar 16 is suitably clamped against mount 24, which clamping action also causes a clamping of mount 24 against the contacting faces of member 38 with the bumper. Hook 110, chain 102, key plate 94, screw 88, and wing nut 92 thus cooperate to form a mechanism for attaching drawbar 16 to bracket 14, and the take-up means associated with the mechanism serve to securely clamp the trailer hitch to vehicle 10.

It will be appreciated that the entire operation of connecting the hitch to vehicle 10 is accomplished without any need for tools or complicated connection means, and additionally, the various adjustable features of the instant hitch are optimumly designed to adapt the hitch for substantially universal use on the various types of bumpers of cars, trucks and other vehicles.

The present hitch is especially valuable to the trailer rental industry since the hitches provided by such companies should be universally adaptable to various styles of bumpers so that each trailer distributing outlet will not have to stock a large variety of hitches to accommodate the various types of towing vehicles which the distributor's customers may have.

Another advantage of the present invention is that hook 110 is attached to the frame bracket 14 rather than the lower edge 118 of bumper 12, to the end that the entire weight of the towed vehicle is not borne by the bumper. The connection to frame bracket 14 also lends stability to the entire trailer hitch.

Having thus described the invention, what is claimed as new and desired to be secured by Letters Patent is:

1. In a hitch for coupling a towed vehicle to attachable structure on a towing vehicle:
   a drawbar;
   a mount adapted to engage said structure and having means supporting said drawbar in a towing position;
   a first releasable mechanism for attaching said mount to said structure;
   a second releasable mechanism for attaching said drawbar to said structure,
   said second mechanism having take-up means for clamping the drawbar against said mount and clamping said mount against said structure; and
   means on the mount for adjustably coupling the latter with said structure and including a member for engaging said structure, there being apparatus shiftably securing said member to the mount for varying the vertical inclination of the latter with respect to said structure when the member is shifted.

2. The invention of claim 1, wherein said structure includes a bumper and a frame attaching the bumper to the towing vehicle, said member presenting a bumper-engaging area lying in a plane, said apparatus permitting shifting of said member to vary the vertical inclination of said plane.

3. The invention of claim 2, said apparatus comprising shaft means rotatably securing the member to the mount, said plane being inclined with respect to the axis of rotation of the shaft.

4. The invention of claim 2, said first mechanism including an extendible length of material between the points of attachment of the first mechanism to the structure and mount, there being means coupled with said length of material for varying the effective distance between said points.

References Cited
UNITED STATES PATENTS
3,113,897  12/1963  Safford _____ 280—502

LEO FRIAGLIA, *Primary Examiner.*

ROBERT R. SONG, *Assistant Examiner.*